(No Model.)
O. C. MONROE.
Feather Renovator.
No. 229,268.    Patented June 29, 1880.
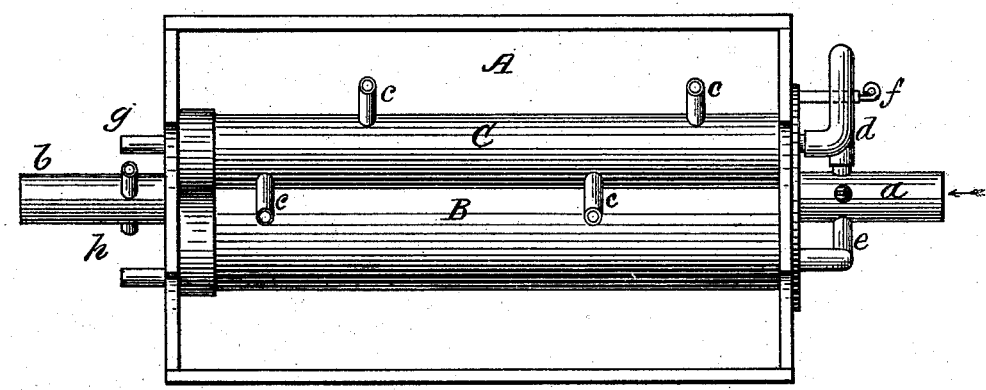
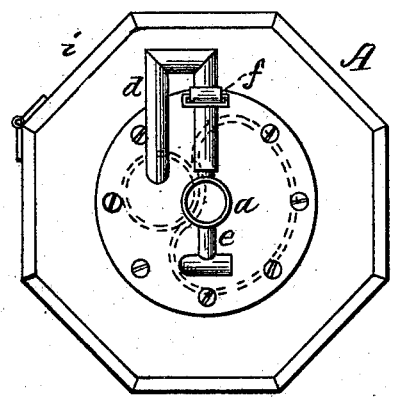
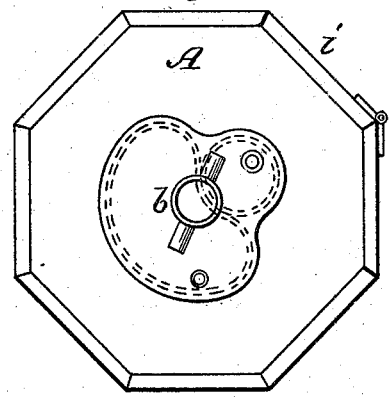
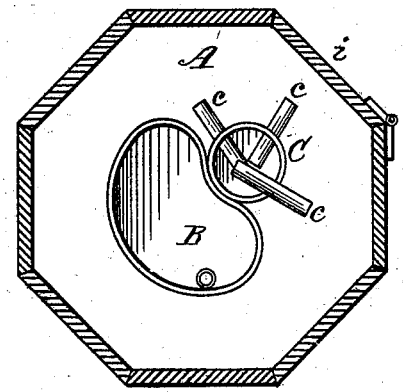
Witnesses
Nat. E. Oliphant,
Geo. R. Porter.
Inventor
Ossian C. Monroe,
per Chas. H. Fowler
Attorney

UNITED STATES PATENT OFFICE.

OSSIAN C. MONROE, OF POULTNEY, VERMONT.

FEATHER-RENOVATOR.

SPECIFICATION forming part of Letters Patent No. 229,268, dated June 29, 1880.

Application filed April 14, 1880. (No model.)

*To all whom it may concern:*

Be it known that I, OSSIAN C. MONROE, a citizen of the United States, residing at Poultney, in the county of Rutland and State of Vermont, have invented certain new and useful Improvements in Feather and Hair Renovators; and I do hereby declare that the following is a full, clear, and exact description of the same, reference being had to the annexed drawings, making a part of this specification, and to the letters and figures of reference marked thereon.

Figure 1 of the drawings is a side elevation of my invention, with a portion of the outer cylinder or vessel removed to show the interior construction and arrangement of the pipes; Figs. 2 and 3, end views of the same, and Fig. 4 a cross-section.

The present invention has relation to certain new and useful improvements in the construction of that class of feather-renovators consisting of a revolving drum or cylinder, into which the feathers are placed, provided with a horizontal pipe having short radial tubes for the escape of the steam into the drum or cylinder, and a drying-pipe, into which the steam is conducted to dry the feathers after being acted upon by the steam.

The object or purpose of the invention is to simplify the construction of the above class of feather-renovators, and also to insure their more thoroughly and effectively drying and cleansing the feathers or hair, by which these are purified and the effete matter is removed therefrom, as illustrated in the drawings and hereinafter described.

In the accompanying drawings, A represents a vessel, of any suitable material and of any desirable shape, supported upon a frame by hollow journals $a$ $b$ in such manner as to admit of the vessel revolving when required. Within the cylinder or vessel A are arranged pipes B C, lengthwise of the vessel, the larger one, B, being used for drying, and the smaller one, C, for steaming, the feathers or hair. The pipe C has jet-tubes $c$, of any suitable number, to admit steam to the vessel A, and extend to the center or axis of the pipe for the purpose of preventing the water of condensation from passing into the feathers or hair.

The hollow axles or journals $a$ $b$ connect with the interior of the pipes B C, the journal $a$ having branch pipes $d$ $e$, the pipe $d$ connecting with the pipe C at its end, and the pipe $e$ with the pipe B, said pipe $d$ having a slide or other suitable faucet, $f$, to close or open communication with the pipe C and hollow journal $a$.

The hollow journal $b$ at the opposite end of the vessel A, communicates with both the pipes B C by branches $g$ $h$, which also are provided with suitable valves to close them when steam is passing from the hollow journal $a$ among the feathers, but are open while the process of drying is taking place.

It will be noticed that both hollow journals $a$ $b$ are alike, and as it becomes necessary to admit steam from one end and at other times from the opposite end, either set of branch pipes will answer the purpose.

The feathers or hair is introduced into the vessel A through a suitable door, $i$, after which the door is closed and the cut-off or faucet $f$ is opened. The hollow journal $a$ being connected to a suitable steam-generating device, the steam passes from the hollow journal into the branch $d$ and to the interior of pipe C, thence through the tubes $c$ into the feathers or hair, and also through the pipe B from the branch $e$.

The vessel A is revolved during the admission of steam, which thoroughly distributes the steam among the feathers or hair.

The faucet or cut-off in the branch pipes $g$ $h$ is closed during the process of steaming to prevent the escape of the steam; but when the feathers or hair have been properly treated the valves in the branch pipes $g$ $h$ are opened, which allows the water of condensation to flow off.

When the feathers or hair have been sufficiently cleansed the valve $f$ is closed, the pipes $g$ $h$ being open, and the steam will flow into the pipe B and through the same, heating the water therein, and thereby drying the feathers or hair.

Having now fully described my invention, what I claim as new, and desire to secure by Letters Patent, is—

In a feather or hair renovator, the vessel A, having pipe B and pipe C, with jet-tubes $c$ extending into the same, in combination with the hollow journals, with branch pipes $d\ e\ g\ h$ and their valves, arranged as described, and for the purpose set forth.

In testimony that I claim the above I have hereunto subscribed my name in the presence of two witnesses.

OSSIAN C. MONROE.

Witnesses:
 EDWARD S. MILLER,
 BARNES FRISBIE.